(12) United States Patent
Zaencker

(10) Patent No.: US 7,796,530 B2
(45) Date of Patent: Sep. 14, 2010

(54) METHOD AND ARRANGEMENT FOR TESTING THE TRANSMISSION SYSTEM AND METHOD FOR QUALITY OF A SPEECH TRANSMISSION

(75) Inventor: Olaf Zaencker, Bad Oldesloe (DE)

(73) Assignee: Siemens Aktiengesellschaft, Munich (DE)

( * ) Notice: Subject to any disclaimer, the term of this patent is extended or adjusted under 35 U.S.C. 154(b) by 1258 days.

(21) Appl. No.: 10/076,108

(22) Filed: Feb. 15, 2002

(65) Prior Publication Data
US 2002/0118648 A1 Aug. 29, 2002

(30) Foreign Application Priority Data
Feb. 15, 2001 (DE) .................. 101 08 856

(51) Int. Cl.
*G06F 15/16* (2006.01)
(52) U.S. Cl. .................... 370/252
(58) Field of Classification Search .......... 370/252, 370/400, 401, 351–356; 709/223–225, 231
See application file for complete search history.

(56) References Cited

U.S. PATENT DOCUMENTS

| | | | | |
|---|---|---|---|---|
| 6,512,746 | B1 * | 1/2003 | Sand .................... | 370/252 |
| 6,553,515 | B1 * | 4/2003 | Gross et al. .................... | 714/47 |
| 6,556,565 | B1 * | 4/2003 | Ward et al. .................. | 370/356 |
| 6,651,099 | B1 * | 11/2003 | Dietz et al. .................. | 709/224 |
| 6,678,250 | B1 * | 1/2004 | Grabelsky et al. ............ | 370/241 |
| 6,741,569 | B1 * | 5/2004 | Clark .......................... | 370/252 |
| 7,272,134 | B2 * | 9/2007 | Iwama et al. ................. | 370/352 |
| 2002/0145979 | A1 * | 10/2002 | Baj ............................ | 370/242 |
| 2002/0167936 | A1 * | 11/2002 | Goodman .................... | 370/352 |

OTHER PUBLICATIONS

Internet-Technologien der Zukunft; Paketvermittelte Internetkommunikation Audio und Video im Inetrnet, by Addison-Wesley; c. 1999.
TIPHON Release 3; Technology Compliance Specification; Part 5: Quality of Service (QoS) Measurement Methodologies, "ETSI TS 101 329-5," v1.1.1, Nov. 2000, pp. 1-17.
Telecommunications and Internet Protocol Harmonization Over Networks (TIPHON); End-to-End Quality of Service in TIPHON Systems; Part 3: Signalling and Control of End-to-End Quality of Service, "ETSI TS 101 329-3," v1.1.1, Jan. 2001, pp. 1-45.
ITU-T Recommendation H.323 (Nov. 2000) Packet-Based Multimedia Communications Systems, pp. 1-4.

* cited by examiner

*Primary Examiner*—Pankaj Kumar
*Assistant Examiner*—Duc T Duong
(74) *Attorney, Agent, or Firm*—King & Spalding L.L.P.

(57) ABSTRACT

Method for testing the transmission quality of a bidirectional real speech transmission or multicast connection over an IP network between a first VoIP endpoint and a second VoIP endpoint. A first number of the RTP speech packets transmitted from the first to the second VoIP endpoint, and a second number of the RTP speech packets transmitted from the second to the first VoIP endpoint being detected over a predetermined, sufficiently long time period, and the first and second numbers being subjected to arithmetic processing, as a result of which a value representing the transmission quality is obtained.

19 Claims, 3 Drawing Sheets

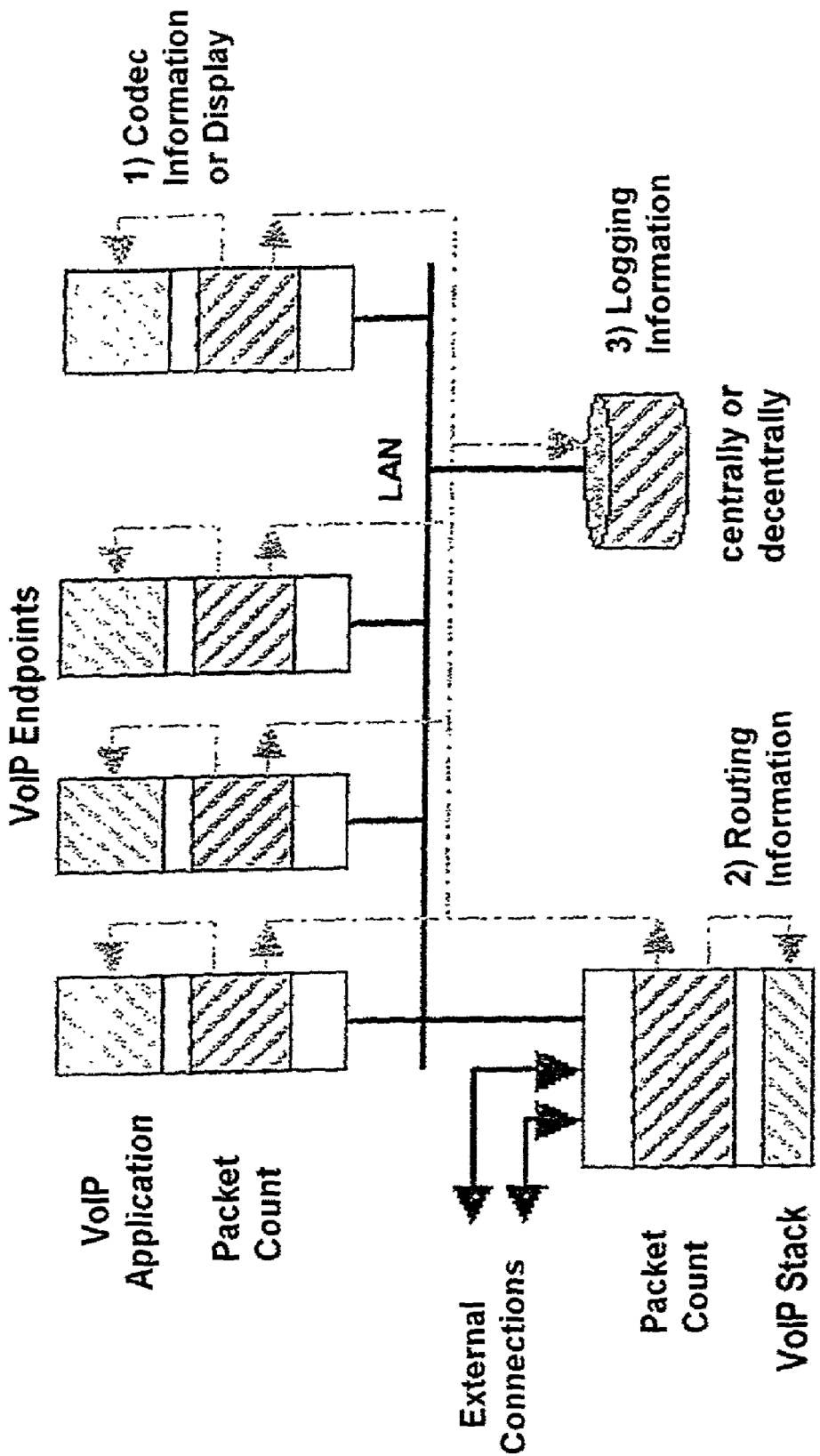

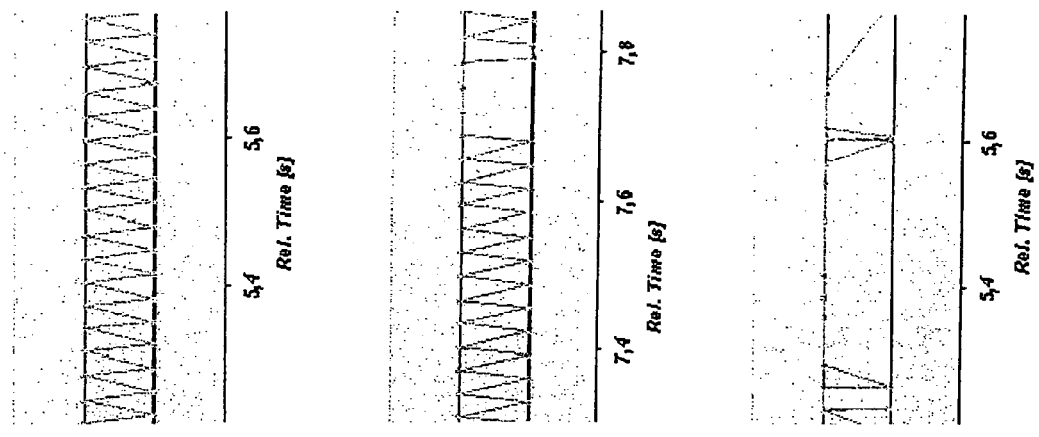
Fig. 2a
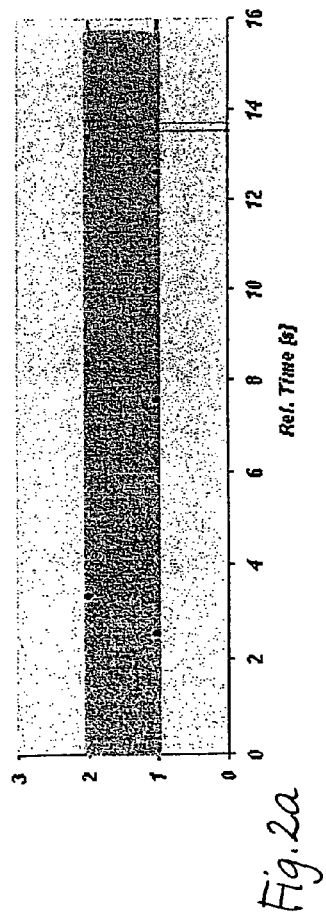
Fig. 2b
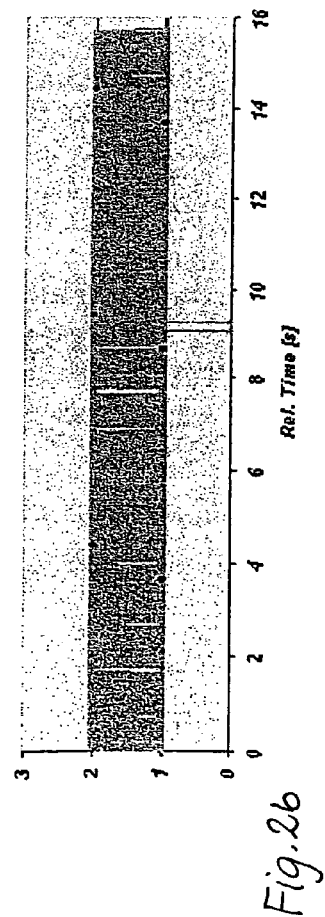
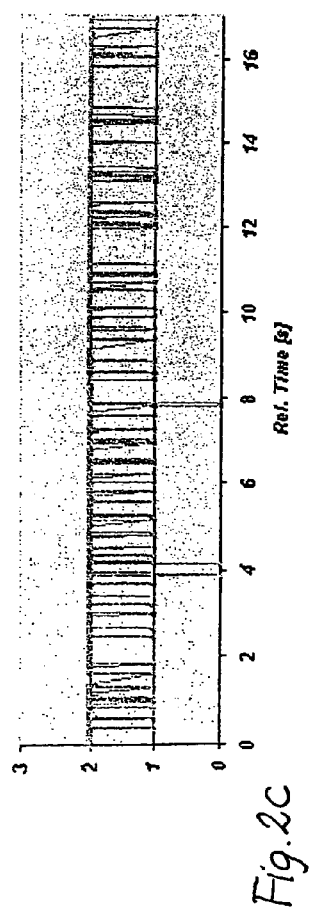
Fig. 2c

METHOD AND ARRANGEMENT FOR TESTING THE TRANSMISSION SYSTEM AND METHOD FOR QUALITY OF A SPEECH TRANSMISSION

CLAIM FOR PRIORITY

This application claims priority to Application No. DE 10108856.6 which was published in the German language on Feb. 15, 2001.

TECHNICAL FIELD OF THE INVENTION

The invention relates to a method and system for checking the speech or transmission quality of a VoIP (Voice over IP) transmission.

BACKGROUND OF THE INVENTION

Speech transmission by means of an IP protocol in local networks, for example in a VoIP system as a supplement to or substitute for an existing communication system (PBX) or as Internet telephony in the long-distance zone is currently still not very widespread. However, it represents a very promising communication method for the future. In combination with other IP-based services, it permits novel, interesting forms of communication.

However, a range of organizational as well as technical problems remain to be solved in the interests of a wide penetration of VoIP.

Particularly in networks without QoS (Quality of Service) mechanisms, the complex interplay of network, communication protocol, operating system and hardware means that speech transmission over IP networks does not deliver constant speech quality. A method is therefore required for assessing the speech quality in order to log the latter (if appropriate, even to signal it) and/or to use it in a subsequent process as control information for adaptive/self-optimizing systems (bandwidth control, and endpoints, alternative route selection, for example at gateways, etc.).

The method should meet the following requirements:
no additional loading of the network by test signals,
assessment of the quality of real speech connections, not the quality of test signals,
automatic determination of the quality,
real time capability of the method (determination of the quality during operation),
simplicity of the method (no complicated calculations; low processor loading),
continuous applicability (running generation of measured data),
full-area applicability (each end point should be taken into account)
transparency for the user of a Voice over IP system (no impairment of the function).

Previous solutions for determining the speech quality can be classified approximately as follows:

a) assessment of network parameters (round-trip delay, etc.) without concrete reference to the particular features of the real time communication; therefore unsuitable for providing adequate information.

b) application layer measurements (PSQM, etc.) in which a special signal is fed in at the transmitter for transmitting via the channel to be examined, and is compared with the signal received at the receiver with the assistance of complex mathematical models, inter alia in order to take account of the physiological properties of the human ear. On the one hand, an additional network load is generated by test samples, while on the other hand the calculation algorithms consume a not inconsiderable portion of the processor power. Appropriate test equipment is indeed available, but can only be used for individual measurements (not least because of the high outlay on apparatus and funds).

c) test series with the participation of testing staff in order to determine the speech quality (MOS). This method is unsuitable from the very start for the continuous application in real installations and very expensive in terms of staff. It can therefore be stated that although methods are available for determining speech quality, none of them meets the above-named requirements.

SUMMARY OF THE INVENTION

In one embodiment of the invention, there is a method for testing the transmission quality of a bidirectional real speech transmission or multicast connection over an IP network between a first VoIP endpoint and a second VoIP endpoint. The method includes, for example, transmitting a first number of RTP speech packets in a direction of the second VOIP endpoint, and transmitting a second number of the RTP speech packets in a direction of the first VoIP endpoint, and detecting at a detection point on a transmission channel between the first and the second VoIP endpoint over a predetermined time period, and arithmetically processing the first and second numbers, and outputting a value representing the transmission quality.

In another aspect of the invention, the predetermined time period for a 10 Mbit/s transmission channel is longer that 5 s.

In another aspect of the invention, the arithmetic processing includes a division, where the value 1 of the quotient representing the highest transmission quality.

In yet another aspect of the invention, the arithmetic processing includes a subtraction, where the value 0 for the difference representing the highest transmission quality.

In another aspect of the invention, the value representing the transmission quality is subjected to a threshold value discrimination in order to suppress side effects due to features of the communication protocol.

In another aspect of the invention, quotients outside a predetermined tolerance range around the value 1 are valid as a representation of a reduced transmission quality.

In still another aspect of the invention, difference values outside a predetermined tolerance range around the value 0 are valid as a representation of a reduced transmission quality.

In another aspect of the invention, the detected first and second numbers and/or the calculated values for a plurality of first and second VoIP endpoints connected to the IP network between which bidirectional speech connections exist in each case are logged.

In another aspect of the invention, the detected first and second numbers and/or the calculated values for a plurality of first and second VoIP endpoints connected to the IP network within which bidirectional speech connections exist in each case are subjected to summarizing statistical processing to obtain an overall value representing the overall transmission quality of the IP network or of a section of the overall transmission quality of the IP Network.

In yet another aspect of the invention, the value representing the transmission quality is signaled to subscribers at the first and/or second VoIP endpoints and/or to an operation control center of the IP network.

In another aspect of the invention, 11. The method as claimed in claim 1, wherein the value representing the transmission quality is used as an input variable for controlling the speech transmission over the IP network.

In another aspect of the invention, the value representing the transmission quality is determined substantially in real time and is signaled or is used as an input variable for controlling the speech transmission.

In still another aspect of the invention, the predetermined time period is in the range of about 10 s to 30 s.

In another embodiment of the invention, there is a method for controlling a speech transmission over an IP network between a first VoIP endpoint and a second VoIP endpoint. The method includes, for example, transmitting a first number of RTP speech packets in the direction of the second VoIP endpoint, and transmitting a second number of the RTP speech packets in the direction of the first VoIP endpoint, and detecting at a detection point on a transmission channel between the first and the second VoIP endpoint over a predetermined time period, and arithmetically processing the first and second numbers, and outputting a value representing the transmission quality; and routing the connection between the first and second VoIP endpoints in the valve.

In yet another embodiment of the invention, there is a method for controlling a speech transmission over an IP network between a first VoIP endpoint and a second VoIP endpoint. The method includes, for example, transmitting a first number of RTP speech packets in the direction of the second VoIP endpoint, transmitting a second number of the RTP speech packets in the direction of the first VoIP endpoint, detecting at a detection point on a transmission channel between the first and the second VoIP endpoint over a predetermined time period, and arithmetically processing the first and second numbers, and outputting a value representing the transmission quality, and setting transmission parameters based on the valve.

In another embodiment of the invention, there is a system. The system includes, for example, a detecting unit, arranged at a detection point on a transmission channel between a first and a second VoIP endpoints to detect a first number of RTP speech packets transmitted in a direction of the second VoIP endpoint, and to detect a second number of the RTP speech packets transmitted in a direction of the first VoIP endpoint, and an arithmetic processing unit connected on the input side to the detecting unit to calculate a value representing the transmission quality from the first and second numbers.

In another aspect of the invention, the arithmetic processing unit has a division or subtraction stage.

In another aspect of the invention, connected downstream of the arithmetic processing unit is a threshold value discriminator to evaluate the value representing the transmission quality with the aid of at least one predetermined threshold value.

In yet another aspect of the invention, the system includes a storage device connected on the input side to the output of the detecting device and/or of the arithmetic processing unit to log the first and second numbers and/or the calculated values.

In another aspect of the invention, the system includes a statistical processing unit, connected on the input side to the output of the detecting device and/or of the arithmetic processing unit, to summarize statistical processing of the detected numbers or calculated values in order to evaluate the overall transmission quality of the IP network or of a section of the same.

In another aspect of the invention, the system includes a signaling device to signal the calculated value or the overall value to the subscribers at the first and/or second VoIP endpoint and/or to an operation control center of the IP network.

BRIEF DESCRIPTION OF THE DRAWINGS

Reference is made for this purpose further below to the description of the exemplary embodiments.

In the figures:

FIG. 1 shows a schematic diagram of the invention in one embodiment.

FIGS. 2a to 2c show an embodiment of the invention in information technology.

DETAILED DESCRIPTION OF THE PREFERRED EMBODIMENTS

Figure 3:
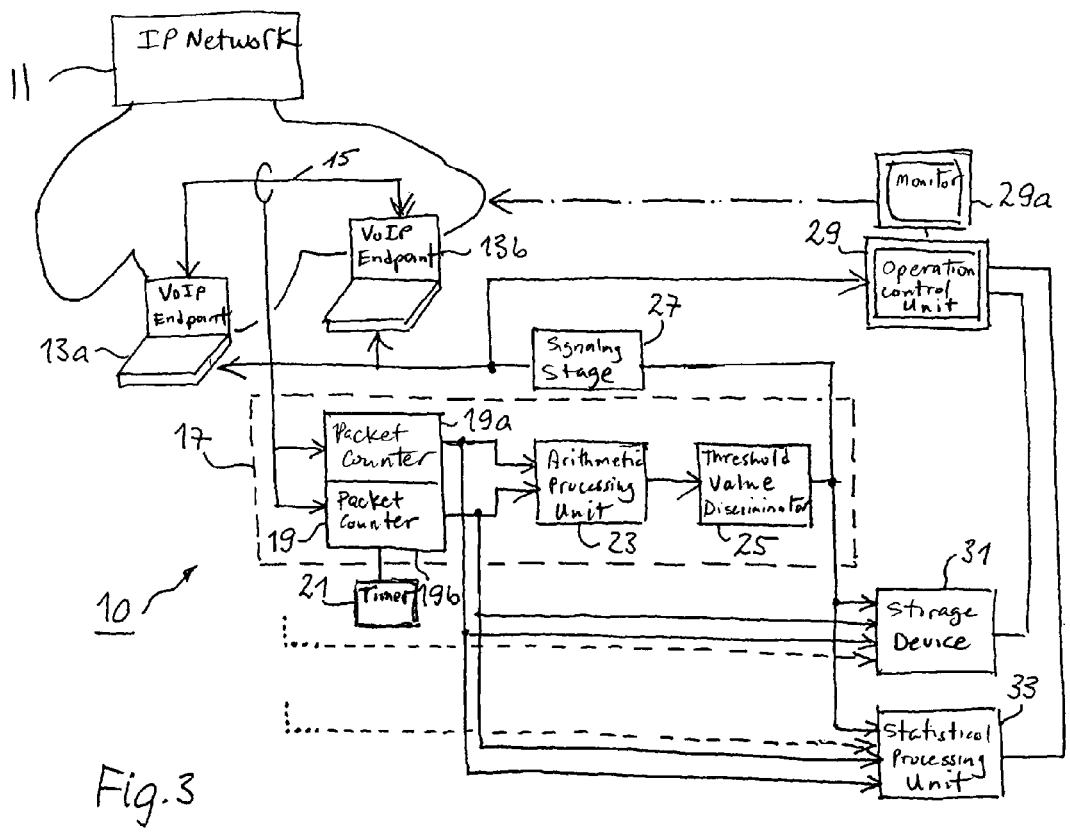
FIG. 3 shows a functional block diagram of a preferred arrangement for testing the transmission quality in a VoIP system.

In one embodiment of the invention, there is a method that can be used simply and cost effectively in the VoIP routine operation, for testing the speech transmission quality, as well as a system suitable for carrying out this method.

One embodiment of the invention is based on experimental results. It has been found from laboratory investigations that exactly as many RTP (Real-Time Transport Protocol) speech packets are transmitted (equilibrium) in both directions (from 1 to 2 and from 2 to 1) in the case of an undisturbed bidirectional speech communication between two VoIP endpoints in accordance with ITU-T Recommendation H.323 (H.323 Terminal, H.323 Gateway, or H.323 MCU), here between two stations 1 and 2 in a Voice over IP system over a sufficiently long time period. If the transmission conditions for Voice over IP deteriorate for any reason, the equilibrium of the number of bidirectionally transmitted RTP speech packets is also demonstrably disturbed. A sliding variation is to be recorded in this case. A deterioration in the speech quality can be demonstrated by measurement via the deviation from the above-mentioned equilibrium of bidirectional RTP speech packets as early as before the loss in quality can even be perceived subjectively by the user.

It is therefore proposed to use the equilibrium or disequilibrium of bidirectionally transmitted RTP speech packets as a criterion for automatically determining the Voice over IP speech quality.

As conditioned by the method (CMSA/CD), the rigorously alternating sequence of bidirectionally transmitted RTP packets can be interrupted even in the case of good speech quality by irregularly transmitted unidirectional n-fold RTP sequences (n>1; typical values being between 2=n=4), which are to be encountered, in turn, sporadically in both directions of communication. Furthermore, a slight discontinuity (unidirectional n-fold RTP sequences with n>1) can also be caused by the cyclically transmitted RTCP (RTCP—Real-Time Transport Control Protocol) packets.

In order for these effects not to be superimposed on the automatic determination of the speech quality, an adequately dimensioned measuring interval of at least 5 seconds, preferably in the range of between 10 and 30 seconds, should be observed. In this case, a measuring interval of 10 seconds corresponds to approximately 635 bidirectional RTP packets in conjunction with a transmission rate of 10 Mbit/s. These time periods are referred to a 10 Mbit/s transmission channel. Other values are valid for the time periods in the case of higher transmission rates. The proposed quality determination process therefore supplies results in a quasi-continuous fashion, virtually in real time.

An advantage of the invention resides in the simplicity of the method. The enumeration of packets as a measuring step for determining the satisfaction of the "RTP equilibrium condition" requires no complicated, computationally intensive algorithms such as would be required, for example, to detect missing isochronicity of RTP speech packets (jitter) with the aid of the standard distribution, which represents a further criterion.

In a preferred embodiment, the arithmetic processing of the detected numerical values of the RTP speech packets transported in both directions includes a simple division or substraction. In this case, the value 1 of the quotient or the value 0 of the difference stands for the highest speech quality or interference-free transmission, and substantial deviations from these values signal transmission interference.

In addition, the above-named packet enumeration can be implemented very far down in the communications stack (RTP) from the point of view of a layer model.

Adjustable threshold values for the deviation from the RTP equilibrium are recommended in order to suppress interference effects (unidirectional n-fold RTP sequences with n>1) This corresponds to a threshold value discrimination with reference to the value that is obtained in the arithmetic processing of the packet numbers and fundamentally represents the transmission quality. In this case, a permissible tolerance range is determined for example around the value 1 in the case of division, or around the value 0 in the case of a subtraction, and only values situated outside the tolerance range are valid as an index of a worsened transmission quality.

The following information can then be generated optionally from the result of the processing of the packet numerical values:
1) Codec information for adaptive systems for automatically changing the compression rate or bandwidth and/or information for displaying the speech quality. In addition to the compression rate or bandwidth, it is possible if appropriate, to adjust further parameters of interfaces or adjustments of the transmission protocol or browser as a function of the value representing the transmission quality. The speech quality can be displayed to the subscribers on their respective terminal and/or to system maintenance staff.
2) Routing information for adaptive systems for automatically selecting alternative routes, for example in gateways.
3) Logging information for logging the speech quality. This logging information can be stored—for the purpose of later use—either locally at the endpoints and/or on a central component.

A preferred embodiment for carrying out the method proposed and having the above-named aspects comprises hardware and/or software components for implementing these aspects, which are not enumerated here individually.

In FIG. 1, the principle and applications of the proposed solution in an IP network (here LAN) in which a plurality of VoIP endpoints are connected and which is itself connected to external connections via a gateway, are sketched schematically. The figure illustrates that values that are obtained during a packet-counting operation packet-count and arithmetic processing, and which characterize the speech transmission quality can, on the one hand, be used as codec information for controlling the transmission characteristics or be displayed on terminals, and can, on the other hand, be used in the gateway server as routing information for a suitable routing of the speech connections and, finally, can be used—centrally or decentrally—as logging information for logging the speech quality.

Three different "communication patterns" of a VoIP speech communication which are formed by connecting RTP packets, exchanged between two VoIP endpoints (stations 1 and 2), in the sequence of their occurrence are shown in FIGS. 2a to 2c. A sequence of 1000 bidirectional RTP packets at 10 Mbit/s (corresponding to approximately 15.8 s call duration) is illustrated in each case. The packets marked dark are RTCP (Real-Time-Control Protocol) packets that are not to be taken into account for the packet counting. This also holds for packets sent to other endpoints (in FIG. 2a, the packet sent to the station 0 on the time axis at approximately t=13.5 s from station 1).

The undisturbed speech communication illustrated in FIG. 2a between stations 1 and 2 exhibits a sharply alternating sequence of RTP packets that appears as a virtually continuously unbroken band, parallel to the abscissa, between the ordinate points 1 and 2 representing stations 1 and 2. At the instant t=6 there is a slight sporadic discontinuity. The zoom representation on the right-hand side of FIG. 2a shows the structure of the horizontal "band" more accurately.

FIG. 2b shows a state of the VoIP system under somewhat worsened transmission conditions that are manifested by the accumulated occurrence of sporadic discontinuities (unidirectional n-fold sequences with n>1; compare, in particular, the zoom representation on the right-hand side of FIG. 2b). However, in this state of the system the user is still unable subjectively to perceive any impairment in speech quality.

Finally, FIG. 2c shows a system state with audibly worsened speech quality, in which interference in the "equilibrium" of the numbers of RTP packets transmitted in both directions that is significant in measurement terms is to be seen. In particular, the zoom representation shows—in a short time segment—relatively long lasting interference in the equilibrium between the transmissions of RTP packets in both directions.

FIG. 3 shows another (as a supplement to the illustration in FIG. 1) embodiment of a preferred test and control system/arrangement for carrying out the proposed method in the form of a functional block diagram. The quality of a bidirectional speech transmission between two VoIP endpoints 13a, 13b, connected to the IP network 11 (local network, Intranet, Extranet, Internet, etc.) as VoIP terminals for a transmission channel 15 is determined by a testing arrangement 17.

The latter comprises a packet counter unit 19, coupled to the transmission channel 15, with two counter sections 19a, 19b for counting the RTP packets transmitted from the VoIP endpoint 13a to the PC 13b, and vice versa. The packet counter unit 19 is assigned a timer 21 which fixes a sufficiently long counting time period and reads out the counter readings after expiry thereof. The counter readings are read out into an arithmetic processing unit 23 which, in particular, comprises a division or subtraction stage and forms a quotient or a difference from the packet count values. Connected to the output of the arithmetic processing unit 23 is a threshold value discriminator 25 that subjects the result of calculation to a threshold discrimination with a predetermined (programmable) absolute tolerance value.

The output, forming the output of the testing arrangement 17, of the threshold value discriminator 25 is connected, on the one hand, to a signaling unit 27 that further signals the value calculated from the packet numbers and characterizing the quality of the speech transmission when the value lies outside the predetermined tolerance range. Signaling is performed, on the one hand, vis-à-vis the participants in the speech communication at the VoIP endpoints 13a or 13b thereof and, on the other hand, vis-à-vis an operation control unit 29 of the VoIP system. The display on a monitor 29a is, in particular, provided there.

Furthermore, the output of the testing arrangement 17 is connected—in parallel with the outputs of the counter sections 19a, 19b of the packet counter unit 19—on the one hand to various inputs of a logging and storage device 31 and, on the other hand, to inputs of a statistical processing unit 33. The outputs of the last-named devices are connected to inputs of the operation control unit 29 independently of the output of the testing arrangement 17 or signaling stage 27.

Thus, the speech quality of the VoIP system is logged over a relatively long time period and a statistical evaluation is executed with the aid of the overall arrangement described above, in addition to the current assessment of the speech quality of a concrete connection in real time or quasi-real time with the inclusion of the information obtained from further connections. The results of the logging and statistical evaluation are used in addition to the current test value for the purpose of system control (parameter setting and routing). Thus, it is possible to monitor the quality of a VoIP transmission in real-time not only in a simple and cost-effective way, but also to influence it quickly and flexibly by suitable control interventions with the aid of the measurement results.

The implementation of the invention is not limited to the above-described examples, but is likewise possible in a multiplicity of modifications that are within the scope of activity of persons skilled in the art.

What is claimed is:

1. A method for testing the transmission quality of a bidirectional real speech transmission or multicast connection over an IP network between a first VoIP endpoint and a second VoIP endpoint, comprising:
    transmitting RTP speech packets from the first to the second VoIP endpoints, and transmitting RTP speech packets from the second to the first VoIP endpoints;
    detecting, at a detection point on a transmission channel between the first and the second VoIP endpoints, over a predetermined time period, an enumeration of the transmitted RTP speech packets from the first to the second VoIP endpoints as a first number, and an enumeration of the transmitted RTP speech packets from the second to the first VoIP endpoints as a second number; and
    arithmetically processing the first and second numbers, and outputting a value which is based on the arithmetical processing representing the transmission quality, wherein the arithmetic processing includes at least one of:
        a division, where a value 1 of the quotient represents the highest transmission quality; and
        a subtraction, where a value 0 for the difference represents the highest transmission quality.

2. The method as claimed in claim 1, wherein the predetermined time period for a 10 Mbit/s transmission channel is longer that 5 s.

3. The method according to claim 2, wherein the predetermined time period is in the range of about 10 s to 30 s.

4. The method as claimed in claim 1, wherein the value representing the transmission quality is subjected to a threshold value discrimination to suppress side effects due to features of a communication protocol.

5. The method as claimed in claim 1, wherein quotients outside a predetermined tolerance range around the value 1 are valid as a representation of a reduced transmission quality.

6. The method as claimed in claim 1, wherein difference values outside a predetermined tolerance range around the value 0 are valid as a representation of a reduced transmission quality.

7. The method as claimed in claim 1, wherein the detected first and second numbers and/or the calculated values for a plurality of first and second VoIP endpoints connected to the IP network between which bidirectional speech connections exist in each case are logged.

8. The method as claimed in claim 1, wherein the detected first and second numbers and/or the calculated values for a plurality of first and second VoIP endpoints connected to the IP network within which bidirectional speech connections exist in each case are subjected to summarizing statistical processing to obtain an overall value representing the overall transmission quality of the IP network or of a section of the overall transmission quality of the IP Network.

9. The method as claimed in claim 1, wherein the value representing the transmission quality is signaled to subscribers at the first and/or second VoIP endpoints and/or to an operation control center of the IP network.

10. The method as claimed in claim 1, wherein the value representing the transmission quality is used as an input variable for controlling the speech transmission over the IP network.

11. The method as claimed in claim 1, wherein the value representing the transmission quality is determined substantially in real time and is signaled or is used as an input variable for controlling the speech transmission.

12. A method for controlling a speech transmission over an IP network between a first VoIP endpoint and a second VoIP endpoint, comprising:
    transmitting RTP speech packets from the first to the second VoIP endpoints, and transmitting RTP speech packets from the second to the first VoIP endpoints;
    detecting, at a detection point on a transmission channel between the first and the second VoIP endpoints, over a predetermined time period, an enumeration of the transmitted RTP speech packets from the first to the second VoIP endpoints as a first number, and an enumeration of the transmitted RTP speech packets from the second to the first VoIP endpoints as a second number;
    arithmetically processing the first and second numbers, and outputting a value which is based on the arithmetical processing representing the transmission quality, wherein the arithmetic processing includes at least one of:
        a division, where a value 1 of the quotient represents the highest transmission quality; and
        a subtraction, where a value 0 for the difference represents the highest transmission quality; and
    routing a connection between the first and second VoIP endpoints based on the value.

13. A method for controlling a speech transmission over an IP network between a first VoIP endpoint and a second VoIP endpoint, comprising:
    transmitting RTP speech packets from the first to the second VoIP endpoints,
    transmitting RTP speech packets from the second to the first VoIP endpoint;
    detecting, at a detection point on a transmission channel between the first and the second VoIP endpoints, over a predetermined time period, an enumeration of the transmitted RTP speech packets from the first to the second VoIP endpoints as a first number, and an enumeration of the transmitted RTP speech packets from the second to the first VoIP endpoints as a second number;
    arithmetically processing the first and second numbers, and outputting a value which is based on the arithmetical processing representing the transmission quality, wherein the arithmetic processing includes at least one of:

a division, where a value 1 of the quotient represents the highest transmission quality; and a subtraction, where a value 0 for the difference represents the highest transmission quality; and setting transmission parameters based on the value.

14. A system, comprising:

a detecting unit implemented via at least hardware, arranged at a detection point on a transmission channel between a first and a second VoIP endpoints, to detect an enumeration of RTP speech packets transmitted from the first to the second VoIP endpoints as a first number, and to detect an enumeration of RTP speech packets transmitted from the second to the first VoIP endpoints as a second number;

an arithmetic processing unit implemented via at least hardware connected on the input side to the detecting unit to calculate a value representing the transmission quality from the first and second numbers, wherein the arithmetic processing includes at least one of:

a division, where a value 1 of the quotient represents the highest transmission quality; and a subtraction, where a value 0 for the difference represents the highest transmission quality.

15. The system as claimed in claim 14, wherein the arithmetic processing unit has a division or subtraction stage.

16. The system as claimed in claim 14, wherein connected downstream of the arithmetic processing unit is a threshold value discriminator to evaluate the value representing the transmission quality with the aid of at least one predetermined threshold value.

17. The system as claimed in claim 14, further comprising a storage device connected on the input side to the output of the detecting device and/or of the arithmetic processing unit to log the first and second numbers and/or the calculated values.

18. The system as claimed in claim 14, further comprising a statistical processing unit, connected on the input side to the output of the detecting device and/or of the arithmetic processing unit, to summarize statistical processing of the detected numbers or calculated values in order to evaluate the overall transmission quality of the IP network or of a section of the same.

19. The system as claimed in claim 14, further comprising a signaling device to signal the calculated value or the overall value to the subscribers at the first and/or second VoIP endpoint and/or to an operation control center of the IP network.

* * * * *